United States Patent [19]

Eickmann

[11] 4,136,522
[45] Jan. 30, 1979

[54] HYDRAULICALLY OPERATED DRIVE- AND CONTROL-UNIT

[76] Inventor: Karl Eickmann, 2420 Isshiki, Hayama-machi, Kanagawa-ken, Japan

[21] Appl. No.: 822,030

[22] Filed: Aug. 5, 1977

Related U.S. Application Data

[62] Division of Ser. No. 610,872, Sep. 8, 1975, Pat. No. 4,086,768, which is a division of Ser. No. 131,782, Apr. 6, 1971, Pat. No. 3,790,105.

[51] Int. Cl.² .................. F15B 11/16; F15B 13/09
[52] U.S. Cl. .................................. 60/484; 60/486; 60/494
[58] Field of Search ............ 60/420, 421, 428, 429, 60/484, 486, 494, 700, 701; 91/170, 171; 180/6.48; 244/52, 53 R

[56] References Cited

U.S. PATENT DOCUMENTS

| Re. 15,243 | 12/1921 | Manly | 60/484 |
|---|---|---|---|
| 2,558,071 | 6/1951 | Castle et al. | 91/171 X |
| 3,253,806 | 5/1966 | Eickmann | 60/715 X |
| 3,279,172 | 10/1966 | Kudo et al. | 60/484 |
| 3,345,016 | 10/1967 | Eickmann | 244/53 R X |
| 3,457,808 | 7/1969 | Eickmann | 60/437 |
| 3,790,105 | 2/1974 | Eickmann | 244/12.1 |

Primary Examiner—Edgar W. Geoghegan

[57] ABSTRACT

A hydraulically operated driving and controlling unit includes a power plant—(prime mover)—with a fluid flow producing means for the supply of at least one pair of hydraulic flows of equal rate of flow. One separated fluid line is exclusively communicated to one outlet of the flow producing means and to one hydraulic motor. A further separated fluid line is exclusively communicated to another outlet of the flow producing means and to another hydraulic motor. The motors carry fluid stream creation means like propellers. The said flows flow through said fluid lines to drive the said motors and fluid stream creation means at all times with, relative to each other, equal rotary velocities for the creation of equal thrusts by said fluid stream creation means. The flow supply device may be variable for proportionate variation of the said rotary velocities and thrusts. In addition a further control means is provided for governing variation of rotary velocities and thrusts relative to each other. The unit is complete in itself and may be transported and adapted to a vehicle to drive and control the movement, direction and attitude of the respective vehicle.

1 Claim, 2 Drawing Figures

HYDRAULICALLY OPERATED DRIVE- AND CONTROL-UNIT

CROSS-REFERENCE TO RELATED APPLICATIONS

This application is a divisional application of my co-pending patent aplication Ser. No. 610,872 filed on Sept. 8, 1975, now Pat. No. 4,086,768 issued May 2, 1978 which is a divisional application of my earlier application Ser. No. 131,782 of Apr. 6, 1971 now U.S. Pat. No. 3,790,105, which issued on Feb. 5, 1974 and priority for this present application is therefore claimed as in said Pat. No. 3,790,105, namely that of application Ser. No. 551,023 of May 18, 1966.

SUMMARY OF THE INVENTION

This invention relates to a hydraulically operated driving and controlling unit. The unit includes a power plant—(prime mover)—and thereto associated fluid flow producing means for the production of at least one pair of separated flows of hydraulic fluid of relatively to each other equal rate of flow. Two separated flow delivery lines each transfer one of said flows to an hydraulic motor whereby said hydraulic motors are driven with, relatively to each other, equal rotary velocities. Fluid stream creation means, such as propellers are associated with said motors for the production of fluid streams of equal thrusts. The unit is complete it itself and transportable. It can be transported and fastened to vehicles to drive and control the movement direction of such vehicles, when said motors are set at opposite sides of the vehicle in symmetric location. A flow delivery control device is added to the fluid flow producing means to varify the rate of flow of said both flows in unison. After the fluid flow producing means a differentiation controller is set between each delivery fluid line and a respective return fluid line. A common handle is applied to said differentiation controller. By said differentiation controller fluid can be selectively bypassed from the delivery fluid lines to return fluid lines for reducing selectively the rate of flow in the selected fluid line and thereby to vary the rotary speed of the associated respective motor.

The object of the invention is, to provide a unit as described above.

Another object of the invention is, to provide said unit for setting onto a vehicle for driving the same and to stabilize the direction of movement of the respective vehicle and to control the direction of movement of the vehicle.

DESCRIPTION OF THE PREFERRED EMBODIMENT

Figure 1:
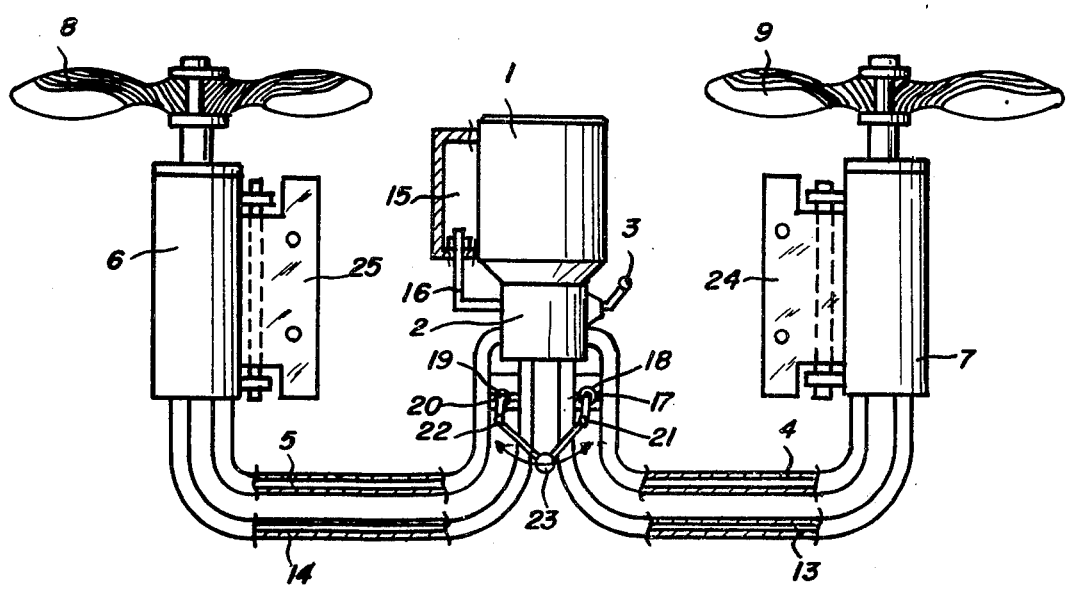
FIG. 1 is a view of the driving unit of the invention.

In FIG. 1 the power plant (prime mover) 1 operates a fluid flow producing means 2 which has two separated outlets wherefrom delivery lines 4 and 5 extend. Inside of the fluid flow producing means are at least two separated working chamber groups each having a plurality of individual working chambers with displacement means associated therewith. Each working chamber group delivers a flow of fluid, one flow of fluid into delivery line 4 and the other into delivery line 5. The rate of flows produced by said chamber groups are equal relatively to each other at all times. Delivery line 5 is exclusively communicated to fluid motor 6 for driving the same. Delivery fluid line 4 is exclusively communicated to fluid motor 7 for driving the latter. Return fluid line 14 passes the return fluid from motor 6 back to the tank 15 or to the fluid flow producing means 2. Return fluid line 13 passes the return fluid back from motor 7 to tank 15 or to fluid flow producing means 2.

Propeller 8 is associated with motor 6 and propeller 9 is associated with motor 7. The said propellers are driven by said motors.

The equalness of rate of flow in the fluid lines relatively to each other assures equal rotary revolutions of both motors and thereby equal thrusts of both equally sized propellers.

Suction fluid line 16 delivers the fluid from tank 15 into the fluid flow producing means 2.

Fluid flow producing means 2 has a rate of flow adjustment controller 3 which can varify the rate of flow and which may be also able to reverse the direction of flow. The interior of fluid flow producing means 2 includes a common or equally acting actuator means for equal adjustment of delivery strokes of all displacement means associated with the working chambers. The interior of fluid flow producing means 2 may therefore be as in FIG. 2 of my U.S. Pat. No. 3,457,808. The control lever 3 of FIG. 1 may correspond substantially to lever 42 of FIG. 2 of said patent.

Fastening means 24 is associated with motor 7 for fastening of said motor on the device to be operated by the unit and fastening means 25 is associated with motor 6 for fastening motor 6 on the device or vehicle to be operated by the unit of the invention.

Thus, control-lever 3 handles the rate of flow and thereby the rotary velocities of the motors and the rotary velocities of the propellers.

The unit can be provided with a differentiation controller. Controller 18 is set into communication bypass line 17. Bypass line 17 extends from delivery line 4 to return line 13. More or less opening or closing controller 18 enables a smaller or bigger flow of fluid from the delivery line into the return line. Thereby the rate of flow and rotary velocity of motor 7 and thrust of propeller 9 can be, relatively to motor and propeller 6 and 8, modified.

Controller 20 can do the same action relatively to motor 6, flow line 5 and propeller 8, because controller 20 is set into bypass communication line 19, which communicates delivery line 5 with return line 14.

Thus, the controllers 18 and 20 constitute the said differentiation controllers. The mentioned controllers 18 and 20 are bypass valves with a cross-sectional area as substantially known in the art, for example from FIG. 2 of U.S. Pat. No. 3,253,806 of May 31, 1966. They are assembled symmetrically to the vertical axis through FIG. 1 of the specification in order, that, when one of the valves is opened, the other remains closed.

For simplicity of handling, the controllers 18 and 20 have a combination lever 23 with respective connectors 21 and 22 which are the levers of controllers 17 and 20 respectively.

Thus, the controller 3 handles the thrust of the propellers 8 and 9 independently or at least partially independently of the rotary speed of the power plant, (prime mover) but maintains the equalness of thrusts of the propellers relatively to each other.

Differentiation controllers 18, 20 (21,22) handle the variation of one or the other of the propellers from the aforesaid equalness to each other.

It is preferred to make the fluid lines 17 and 19 and the aforesaid controllers 18 and 20 of restricted cross-sectional area in order that at high vehicle speeds only a small portion of the main flows can flow through the controllers and lines 17 and 19 to 18 and 20. Thereby it is prevented that a vehicle with the unit of the invention thereon can at high speeds turn in too sharp a curve.

Figure 2:
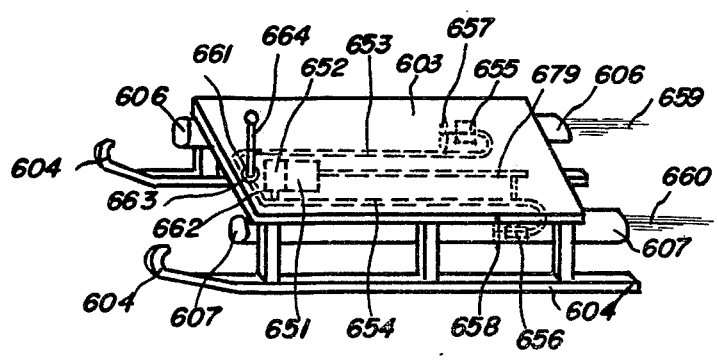
FIG. 2 is a view of a vehicle which employs a system of the unit of the invention.

In the vehicle of FIG. 2 the vehicle 603 has supports 604 for sliding on ground. Power plant prime mover 651 drives fluid flow supply device 652. Controller 664 corresponds to controller 3 of FIG. 1. Fluid lines 661 and 662 correspond to fluid lines 5 and 4 of FIG. 1. Motors 655 and 656 correspond to motors 6 and 7 of FIG. 1.

Propellers 657 and 658 correspond to propellers 8 and 9 of FIG. 1.

The motors 655,656 and the propellers 657,658 are set into ducts 606,607 and produce in said ducts the driving fluid streams 659 and 660.

The equalness of rates of flow in the delivery lines assures the equalness of thrusts in fluid streams 659 and 660. The motors, propellers and ducts are mounted symmetrically on opposite right and left sides of the medial vertical plane of the vehicle and said symmetry of fluid stream thrusts provides the straight forward move of the vehicle.

By rate of flow adjustment of controller 664 the speed of the vehicle is controlled from highest forward speed over stand still to reverse movement and speed and also for braking of high forward speed by reverse operation of motor rotary direction and thrust. The latter also being done by the rate of adjustment of controller 664.

While the vehicle of FIG. 2 shows an example thereof, where the unit of the invention can be applied, it should be understood, that it could also be applied on cars, ships, boats, aircraft, or on devices for the supply of fluid streams.

What is claimed is:

1. A driving and controling unit, comprising in combination:
   a power plant (prime mover),
   at least one fluid flow producing device,
   at least a pair of linear or rotary acting hydraulic motors,
   said device associated with and driven by said power plant,
   said device including a plurality of separated working chamber groups of a plurality of commonly acting fluid displacement chambers and thereto associated displacement means in each of said groups,
   said device producing in said groups at least a pair of separated and with respect to each other independent output flows of hydraulic fluid under pressure with the rates of flow of flows in said at least one pair of output flows being constantly proportionate to each other;
   separate and independent supply lines delivering one flow of said flows directly to at least one of said motors and at least another flow of said flows to at least another of said motors;
   the number of motors supplied by each flow being equal to the number of motors supplied by the other flow of the same pair of flows;
   said motors including flow receiving spaces;
   said flow receiving spaces of each motor of the same pair of motors being proportionate to each other in volume;
   whereby said motors of the same pair of flows receive with respect to one another proportionate rates of flow to one anothers proportionate volumes for actuation and maintenance of at all times relatively to each other proportionate speed of motion of said motors of the same pair of flows;
   a common rate of flow adjustment device associated with said fluid flow producing device and to said displacement means of all of said groups for at all times equal relatively to each other variation of rate of flow of said output flows for varying the rate of flow to the said motors in unison and independently of the speed of the power plant for equal variation of the rotary revolutions of said motors;
   at least two variable by pass control valves having each a closed range and an at least partially open range; said valves each communicated to a different line of said separate supply lines and a common bypass control-means for selectively either holding said control valves in said closed range or for selectively opening one of said bypass control valves to a desired extent of the variability of said variable bypass control valves.

* * * * *